US009436762B1

(12) United States Patent
Lau et al.

(10) Patent No.: US 9,436,762 B1
(45) Date of Patent: Sep. 6, 2016

(54) SHARING A PLUG-IN INSTANCE IN A WEB CLIENT

(75) Inventors: Cynthia W. Lau, San Jose, CA (US); Johann Tomas Sigurdsson, Reykjavik (IS); Marc-André Decoste, Candiac (CA)

(73) Assignee: Google Inc., Mountain View, CA (US)

( * ) Notice: Subject to any disclaimer, the term of this patent is extended or adjusted under 35 U.S.C. 154(b) by 861 days.

(21) Appl. No.: 13/342,907

(22) Filed: Jan. 3, 2012

(51) Int. Cl.
*G06F 21/62* (2013.01)
*G06F 11/30* (2006.01)
*G06F 17/30* (2006.01)

(52) U.S. Cl.
CPC ......... *G06F 17/30861* (2013.01); *G06F 21/62* (2013.01); *G06F 11/30* (2013.01); *G06F 11/3003* (2013.01); *G06F 2221/2119* (2013.01)

(58) Field of Classification Search
CPC ............. G06F 17/30861; G06F 21/62; G06F 2221/2119; G06F 11/30; G06F 11/3003
USPC .......................................................... 715/760
See application file for complete search history.

(56) References Cited

U.S. PATENT DOCUMENTS

| 7,523,409 B2 * | 4/2009 | Yolleck et al. ............... 715/777 |
| 8,117,131 B2 * | 2/2012 | Boozer .......................... 705/310 |
| 2003/0055737 A1 * | 3/2003 | Pope .................... G06F 21/606 705/26.35 |
| 2009/0007092 A1 * | 1/2009 | Wolfe ....................... G06F 9/54 717/173 |
| 2010/0070899 A1 * | 3/2010 | Hunt et al. ..................... 715/769 |
| 2010/0115451 A1 * | 5/2010 | Moore ............. G06F 17/30899 715/777 |
| 2010/0257451 A1 * | 10/2010 | Halevi et al. ................. 715/733 |
| 2010/0262904 A1 * | 10/2010 | Chou et al. .................... 715/240 |

OTHER PUBLICATIONS

Silbey, Marc, et al., "Understanding and Working in Protected Mode Internet Explorer," <http://msdn.microsoft.com/en-us/library/bb250462(v=vs.85).aspx>, Jan. 2006 (last updated Feb. 2011), Microsoft Corporation.

* cited by examiner

*Primary Examiner* — Amy Ng
*Assistant Examiner* — Andres E Gutierrez
(74) *Attorney, Agent, or Firm* — McDermott Will & Emery LLP

(57) ABSTRACT

Configurations for sharing an instance of an executing process for a plug-in based on a session and a cookie data store associated with the session are disclosed. A cookie data store can be associated with a tab running in a corresponding security mode. By way of example, instead of initiating a new process for the plug-in in a new tab, the subject technology can first determine whether a previous tab is running an instance of a plug-in process. If this is the case, the subject technology can then determine whether the previous tab is running in the same security mode (e.g., protected or unprotected) as the new tab. The subject technology then shares the existing plug-in process in the previous tab without instantiating a new plug-in process in the new tab.

23 Claims, 4 Drawing Sheets

US 9,436,762 B1

SHARING A PLUG-IN INSTANCE IN A WEB CLIENT

BACKGROUND

In a given web client (e.g., a web browser), web content can be displayed in the web client. For example, web content can include a mixture of text and graphics (e.g., images or photos, etc.). The web client can maintain one or more cookies to store different data associated with the web client.

SUMMARY

The subject technology provides for sharing an instance of a plug-in for a web client. The subject technology determines whether a session associated with a current tab is associated with a first tab. The subject technology determines whether the current tab is running in a security mode that the first tab is running in if the session is associated with the first tab. Further, the subject technology determines whether the first tab includes the instance of the plug-in if the current tab is running in the security mode that the first tab is running in. For the current tab, the subject technology utilizes the plug-in in the first tab to access a shared resource associated with the first tab.

The subject technology further provides a system for sharing an instance of a plug-in for a web client. The system includes memory, one or more processors, and one or more modules stored in memory and configured for execution by the one or more processors. The system includes a browser module configured to provide a first tab and a current tab for the web client in which the first tab includes the instance of the plug-in. The system includes a cookies module configured to store a cookie data store associated with the first tab. The system further includes a session module configured to determine whether a session associated with the current tab is associated with the first tab, to determine whether a security mode of the current tab matches a security mode of the first tab if the session associated with current tab is associated with the first tab, and to utilize, for the current tab, the plug-in in the first tab to access the cookie data store associated with the first tab if the security modes match.

Yet another aspect of the subject technology provides for determining whether a session associated with a current tab is associated with a first tab. The subject technology determines whether the current tab is running in a security mode that the first tab is running in if the session is associated with the first tab. The subject technology determines whether the first tab includes the instance of the plug-in if the current tab is running in the security mode that the first tab is running in. For the current tab, the subject technology utilizes the plug-in in the first tab to access a shared resource associated with the first tab for performing one or more operations on the shared resource.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the following figures.

DETAILED DESCRIPTION

Figure 1:
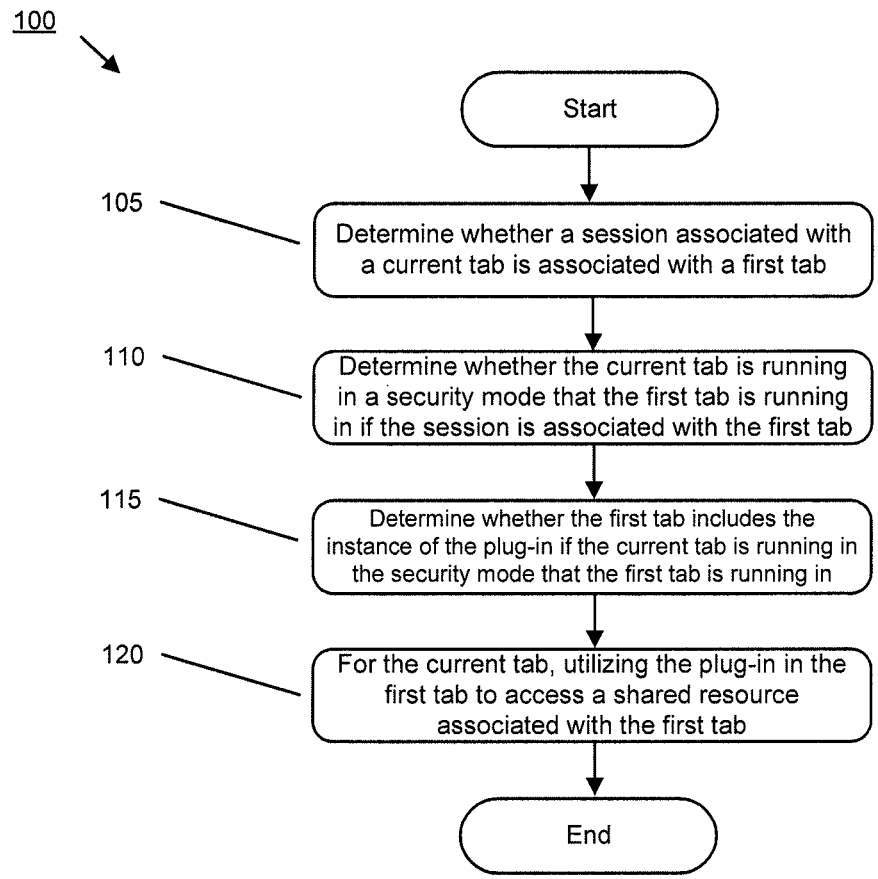
FIG. 1 conceptually illustrates an example process for sharing an instance of a plug-in for a web client.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

In some configurations of a plug-in running in a web client (e.g., web browser), a separate operating system process is started for each toolstrip instance (e.g., user interface elements displayed in the toolbar display area of the web client) of the plug-in within a tab window ("tab" as used hereinafter). As used herein, the term "process" when utilized in connection with the web client refers to an instance of an operating system (OS) process (e.g., a computer program that is executing). Moreover, a plug-in can be understood as a small application that can provide additionally functionality to a parent application program which, in this case, is included in a toolbar display area of the web client. The web client can include a graphical user interface (GUI) including one or more tabs within a window of the web client. Each tab within the window of the web client can include different web content and/or be associated with one or more sessions (e.g. user sessions). Thus, each tab can be understood as a respective window contained within the window of the client. For instance, the web client can enable a user to open multiple tabs in a single browser window. A respective web page can be included in each tab in the web client.

In some configurations, an OS process can include multiple threads that execute instructions concurrently. In some instances, 2 separate processes are started within a tab of a web client (e.g., one for the toolstrip and one for a web client help object (i.e., a program that runs each time the web client is activated)). Moreover, each session in the web client can potentially span across one or more different tabs. For instance, code within a first web page in a first tab can open up a second tab in response to a user interaction within the first tab. The session in this instance would span across the two different tabs and each tab would include a respective process for the toolstrip plug-in. Therefore, the processing and memory footprint of the web client would increase as each new tab is open in the browser.

Moreover, each tab in a web client can run in a protected or unprotected security mode. In on example, the web client restricts file writes to low-integrity locations (i.e., locations with lower trustworthiness), including cookies, for a tab running in a protected mode. A tab running in the protected mode has a lower integrity or lower trustworthiness and should have restricted write access to a cookie data store. The cookie data store in some configurations stores one or more cookies for the web client. To implement this security model, the browser maintains separate cookie data stores depending on whether the tab instance is in protected or unprotected mode.

In order to address the above issues, the subject technology shares an instance of an executing process for a plug-in based on a session and which cookie data store is utilized. As mentioned above, two separate cookie data stores are utilized for a tab running in protected mode and another tab running in unprotected mode. By way of example, instead of initiating a new process for the plug-in in a new tab, the subject technology can first determine whether a previous tab is running an instance of a plug-in process. If this is the case, the subject technology can then determine whether the previous tab is running in the same security mode (e.g., protected or unprotected) as the new tab. Tabs that run in the same security mode can therefore access the same cookie data store. In an instance in which the new tab is in the same security mode as the previous tab, the subject technology shares the existing plug-in process in the previous tab without instantiating a new plug-in process in the new tab. In this manner, the memory and processor usage of the web client can be optimized.

In some configurations, after an instance of a plug-in process (e.g, a shared plug-in instance) is instantiated, each tab instance can include a lightweight wrapper to the plug-in instance. The lightweight wrapper can be understood as another object that makes calls to the plug-in instance. The memory requirements for the lightweight wrapper object are significantly lower in comparison to the memory requirements for the plug-in instance. In one example, a first tab includes a lightweight wrapper object to the plug-in instance, and after a second tab is opened or created, the second tab also includes a respective lightweight wrapper object to the plug-in instance. Further, each subsequent tab can maintain a respective lightweight wrapper object for the shared plug-in instance.

FIG. 1 conceptually illustrates an example process 100 for sharing an instance of a plug-in for a web client. More specifically, the process 100 can be implemented by the web client in order to optimize memory utilized by the plug-in. The plug-in in one example performs one or more operations for accessing cookies stored by the web client in order to manage a session associated with the web client. In the context of the web client, the session can include data for managing the state of a user's browsing activity across one or more web sites. For instance, the session can include information including a session identifier, session data (e.g., user name, account number, user credentials, etc.), a security token(s) (e.g., for authenticating a user), or metadata for indicating different parameters associated with a user and/or the web client. In the example described in FIG. 1, the process 100 can be executed by the web client upon instantiation of a new tab (e.g., when a user "opens" the new tab via a command) within a window of the web client.

The process 100 starts at 105 by determining whether a session associated with a current tab is associated with a first tab. The current and first tabs can be included in a window (e.g., a main window frame) of the web client. In one example, a session is associated with the first tab that is open or instantiated prior to the current tab. For instance, a session can be created for the first tab after the first tab is open for browsing web content (e.g., on a web page). The process 100 can make a determination at 105 that the same session associated with the first tab is also associated with the current tab.

The process 100 at 110 determines whether the current tab is running in a security mode that the first tab is running in if the session is associated with the first tab. In one example, the web client can utilize (e.g., share) a particular cookie data store for each tab in the same security mode. The current tab and the first tab therefore can utilize the same cookie data store if both tabs are in the same security mode. Each tab can be in a respective security mode that provides a level of trustworthiness including a corresponding set of privileges. For instance, the security mode is one of a protected or unprotected mode in one example. If the tab is in a protected mode, the web client can withhold privileges needed to install programs (e.g., third party plug-ins for the web client) or modify system data (e.g., files, configuration settings, etc.) in one example. In contrast, if the tab is in an unprotected mode, more privileges can be granted to the web client to install programs and/or modify system data. Other types of security modes with a different security level (e.g., administrative, high, medium, low, etc.) with different sets of privileges could be provided by the web client and still be within the scope of the subject technology.

At 115, the process 100 determines whether the first tab includes an instance of the plug-in if the current tab is running in the security mode that the first tab is running in. The process 100 continues to 120, for the current tab, utilize the plug-in in the first tab to access a shared resource associated with the first tab. In one example, the shared resource is a cookie data store. The cookie data store can be stored locally and includes one or more cookies for the web client. Each cookie from the one or more cookies contains arbitrary data. For instance, the arbitrary data can include session data.

In some configurations, the process 100 utilizes the plug-in in the first tab by utilizing a wrapper to the instance of the plug-in in the first tab. The wrapper could be an object that calls the instance of the plug-in in the first tab. In this manner, the process 100 can optimize memory usage of the web client by not instantiating a new instance of the plug-in. The current tab performs one or more operations utilizing the wrapper for the instance of the plug-in in the first tab.

By way of example, the plug-in performs one or more operations on the cookie data store. The one or more operations can include an operation to retrieve information for a single cookie, an operation to retrieve all cookies from the cookie data store, an operation to store a cookie in the cookie data store, an operation to delete a cookie in the cookie data store, or an operation to get all cookie data stores of the web client.

Figure 2:
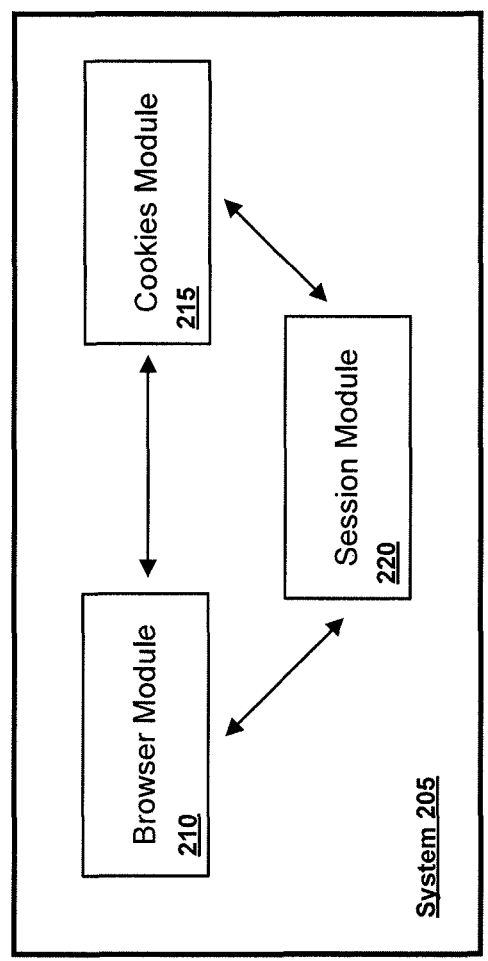
FIG. 2 conceptually illustrates an example computing environment.

FIG. 2 conceptually illustrates an example computing environment including a system for sharing an instance of a plug-in for a web client. In particular, FIG. 2 shows a system 205 for implementing the above described process in FIG. 1. In some configurations, the system 205 is part of an implementation running a particular machine. The system 205 can be configured to execute the web client in one example.

As shown in FIG. 2, the system 205 includes several modules for providing different functionality. The system 205 is configured to include a browser module 210, a cookie module 215 and a session module 220. The browser module 210 is configured to provide a first tab and a current tab for the web client. The first tab includes the instance of the plug-in in some configurations. The cookies module 215 is configured to store a cookie data store associated with the first tab. The session module 220 is configured to determine whether a session associated with the current tab is associated with the first tab. The session module 220 is further configured to determine whether a security mode of the current tab matches a security mode of the first tab if the session associated with current tab is associated with the first tab. The session module 220 is also configured to utilize, for the current tab, the plug-in in the first tab to access the cookie data store associated with the first tab if the security modes match. In one example, the current tab utilizes the plug-in in the first tab to access the cookie data store associated with the first tab. In this manner, the cookie data store is a shared resource of the first and current tabs. The cookie data store includes one or more cookies for the session associated with the first tab.

As further shown in FIG. 2, each of the aforementioned modules can be configured to communicate between each other. For instance, different data, messages, API calls and returns can be passed between the different modules in the system 205.

Many of the above-described features and applications are implemented as software processes that are specified as a set of instructions recorded on a machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of machine readable media include, but are not limited to, CD-ROMs, flash drives, RAM chips, hard drives, EPROMs, etc. The machine readable media does not include carrier waves and electronic signals passing wirelessly or over wired connections.

In this specification, the term "software" is meant to include firmware residing in read-only memory and/or applications stored in magnetic storage, which can be read into memory for processing by a processor. Also, in some implementations, multiple software components can be implemented as sub-parts of a larger program while remaining distinct software components. In some implementations, multiple software subject components can also be implemented as separate programs. Finally, any combination of separate programs that together implement a software component(s) described here is within the scope of the subject technology. In some implementations, the software programs, when installed to operate on one or more systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some configurations are implemented as software processes that include one or more application programming interfaces (APIs) in an environment with calling program code interacting with other program code being called through the one or more interfaces. Various function calls, messages or other types of invocations, which can include various kinds of parameters, can be transferred via the APIs between the calling program and the code being called. In addition, an API can provide the calling program code the ability to use data types or classes defined in the API and implemented in the called program code.

One or more APIs may be used in some configurations. An API is an interface implemented by a program code component or hardware component ("API implementing component") that allows a different program code component or hardware component ("API calling component") to access and use one or more functions, methods, procedures, data structures, classes, and/or other services provided by the API implementing component. An API can define one or more parameters that are passed between the API calling component and the API implementing component.

An API allows a developer of an API calling component (that could be a third party developer) to utilize specified features provided by an API implementing component. There may be one API calling component or there may be more than one such component. An API can be a source code interface that a computing system or program library provides to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some configurations the API implementing component may provide more than one API, each providing a different view of or with different aspects that access different aspects of the functionality implemented by the API implementing component. For example, one API of an API implementing component can provide a first set of functions and can be exposed to third party developers, and another API of the API implementing component can be hidden (not exposed) and provide a subset of the first set of functions and also provide another set of functions, such as testing or debugging functions which are not in the first set of functions. In other configurations the API implementing component may itself call one or more other components via an underlying API and thus be both an API calling component and an API implementing component.

An API defines the language and parameters that API calling components use when accessing and using specified features of the API implementing component. For example, an API calling component accesses the specified features of the API implementing component through one or more API calls or invocations (embodied for example by function or method calls) exposed by the API and passes data and control information using parameters via the API calls or invocations. The API implementing component may return a value through the API in response to an API call from an API calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API calling component) and an API implementing component. Transferring the API calls may include issuing, initiating, invoking, calling, receiving, returning, or responding to the function calls or messages. In other words, transferring can describe actions by either of the API calling component or the API implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API implementing component. The API calling component therefore can declare variables, use pointers to, use or instantiate constant values of such types or classes by using definitions provided in the API.

Generally, an API can be used to access a service or data provided by the API implementing component or to initiate performance of an operation or computation provided by the API implementing component. By way of example, the API implementing component and the API calling component may each be any one of an operating system, a library, a device driver, an API, an application program, or other module (it should be understood that the API implementing component and the API calling component may be the same or different type of module from each other). API implementing components may in some cases be embodied at least in part in firmware, microcode, or other hardware logic. In some configurations, an API may allow a client program to use the services provided by a Software Development Kit (SDK) library. In other configurations an application or other client program may use an API provided by an Application Framework. In these configurations the application or client program may incorporate calls to functions or methods provided by the SDK and provided by the API or use data types or objects defined in the SDK and provided by the API. An Application Framework may in these configurations provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API calling component may be a local component (i.e., on the same data processing system as the API implementing component) or a remote component (i.e., on a different data processing system from the API-implementing component) that communicates with the API-implementing component through the API over a network. It should be understood that an API implementing component may also act as an API calling component (i.e., it may make API calls to an API exposed by a different API implementing component) and an API calling component may also act as an API implementing component by implementing an API that is exposed to a different API calling component.

The API can allow multiple API calling components written in different programming languages to communicate with the API implementing component (thus the API may include features for translating calls and returns between the API implementing component and the API calling component). The API however can be implemented in terms of a specific programming language. An API calling component can, in one configuration, call APIs from different providers such as a set of APIs from an OS provider and another set of APIs from a plug-in provider and another set of APIs from another provider (e.g. the provider of a software library) or creator of the another set of APIs.

The following description describes an example API architecture in which configurations of the subject technology can be implemented.

Figure 3:
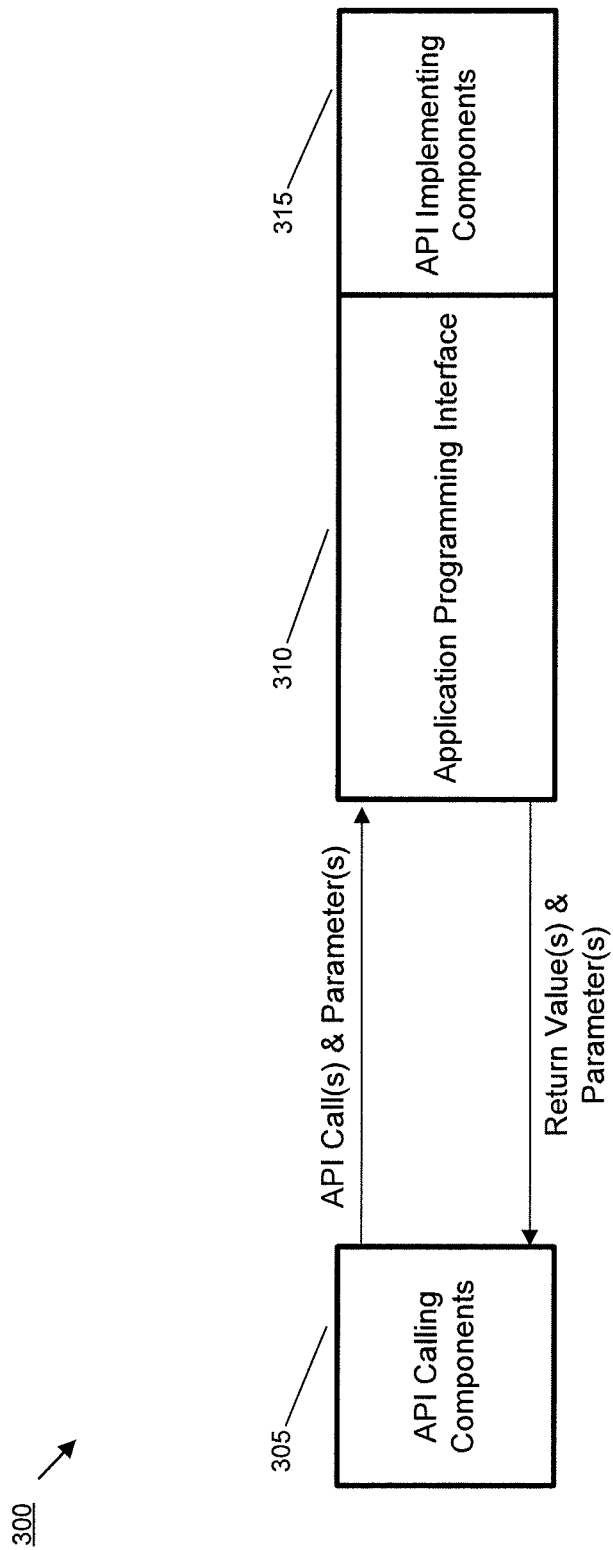
FIG. 3 conceptually illustrates an example application programming interface (API) architecture.

FIG. 3 is a block diagram illustrating an example API architecture, which can be used in some configurations of the subject technology. As shown in FIG. 3, the API architecture 300 includes the API implementing component 315 (e.g., an operating system, a library, a device driver, an API, an application program, software or other module) that implements the API 310. The API 310 specifies one or more functions, methods, classes, objects, protocols, data structures, formats and/or other features of the API-implementing component that can be used by the API-calling component 305. The API 310 can specify at least one calling convention that specifies how a function in the API implementing component receives parameters from the API calling component and how the function returns a result to the API calling component. The API calling component 305 (e.g., an operating system, a library, a device driver, an API, an application program, software or other module), makes API calls through the API 310 to access and use the features of the API implementing component 315 that are specified by the API 310. The API implementing component 315 can return a value through the API 310 to the API calling component 305 in response to an API call.

It will be appreciated that the API implementing component 315 can include additional functions, methods, classes, data structures, and/or other features that are not specified through the API 310 and are not available to the API calling component 305. It should be understood that the API calling component 305 can be on the same system as the API implementing component 315 or can be located remotely and accesses the API implementing component 315 using the API 310 over a network. While FIG. 3 illustrates a single API calling component 305 interacting with the API 310, it should be understood that other API calling components, which can be written in different languages (or the same language) than the API calling component 305, can use the API 310.

The API implementing component 315, the API 310, and the API calling component 305 can be stored in a machine-readable medium, which includes any mechanism for storing information in a form readable by a machine (e.g., a computer or other data processing system). For example, a machine-readable medium includes magnetic disks, optical disks, random access memory, read only memory, flash memory devices, etc.

The following description describes an example system in which aspects of the subject technology can be implemented.

Figure 4:
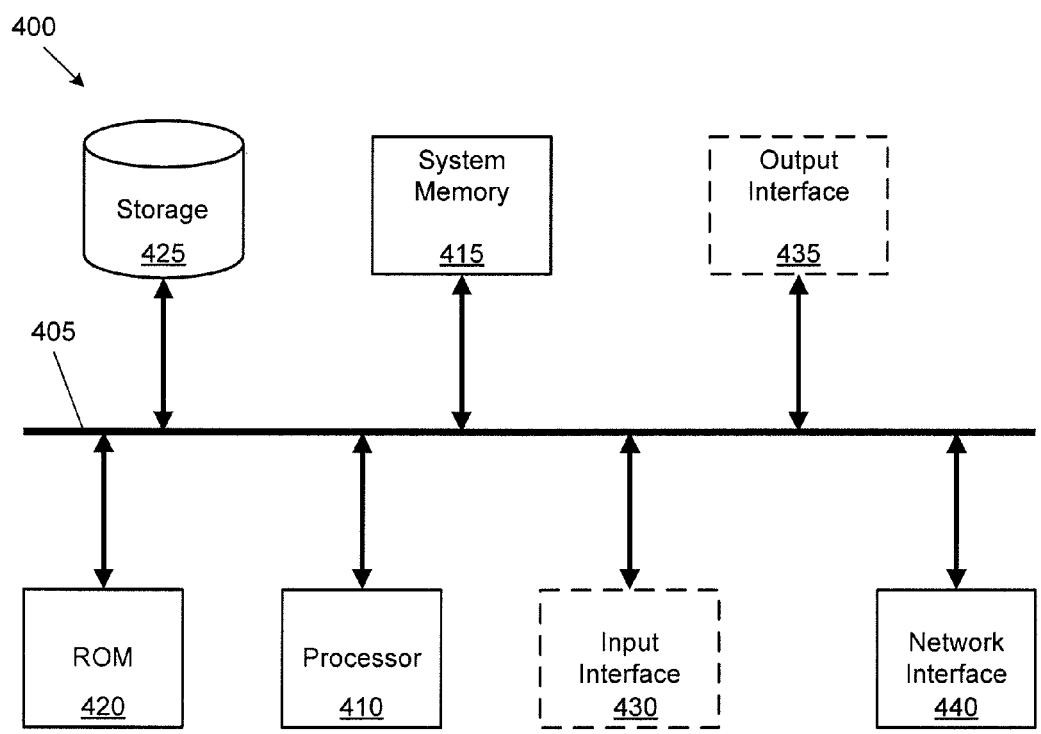
FIG. 4 conceptually illustrates a system with which some implementations of the subject technology may be implemented.

FIG. 4 conceptually illustrates a system 400 with which some implementations of the subject technology can be implemented. The system 400 can be a computer, phone, PDA, or any other sort of electronic device. Such a system includes various types of computer readable media and interfaces for various other types of computer readable media. The system 400 includes a bus 405, processing unit(s) 410, a system memory 415, a read-only memory 420, a storage device 425, an optional input interface 430, an optional output interface 435, and a network interface 440.

The bus 405 collectively represents all system, peripheral, and chipset buses that communicatively connect the numerous internal devices of the system 400. For instance, the bus 405 communicatively connects the processing unit(s) 410 with the read-only memory 420, the system memory 415, and the storage device 425.

From these various memory units, the processing unit(s) 410 retrieves instructions to execute and data to process in order to execute the processes of the subject technology. The processing unit(s) can be a single processor or a multi-core processor in different implementations.

The read-only-memory (ROM) 420 stores static data and instructions that are needed by the processing unit(s) 410 and other modules of the system 400. The storage device 425, on the other hand, is a read-and-write memory device. This device is a non-volatile memory unit that stores instructions and data even when the system 400 is off. Some implementations of the subject technology use a mass-storage device (such as a magnetic or optical disk and its corresponding disk drive) as the storage device 425.

Other implementations use a removable storage device (such as a flash drive, a floppy disk, and its corresponding disk drive) as the storage device 425. Like the storage device 425, the system memory 415 is a read-and-write memory device. However, unlike storage device 425, the system memory 415 is a volatile read-and-write memory, such a random access memory. The system memory 415 stores some of the instructions and data that the processor needs at runtime. In some implementations, the subject technology's processes are stored in the system memory 415, the storage device 425, and/or the read-only memory 420. For example, the various memory units include instructions for processing multimedia items in accordance with some implementations. From these various memory units, the processing unit(s) 410 retrieves instructions to execute and data to process in order to execute the processes of some implementations.

The bus 405 also connects to the optional input and output interfaces 430 and 435. The optional input interface 430 enables the user to communicate information and select commands to the system. The optional input interface 430 can interface with alphanumeric keyboards and pointing devices (also called "cursor control devices"). The optional output interface 435 can provide display images generated by the system 400. The optional output interface 435 can interface with printers and display devices, such as cathode ray tubes (CRT) or liquid crystal displays (LCD). Some implementations can interface with devices such as a touchscreen that functions as both input and output devices.

Finally, as shown in FIG. 4, bus 405 also couples system 400 to a network interface 440 through a network adapter (not shown). In this manner, the computer can be a part of a network of computers (such as a local area network ("LAN"), a wide area network ("WAN"), or an Intranet, or an interconnected network of networks, such as the Internet. Any or all components of system 400 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes can be rearranged, or that all illustrated steps be performed. Some of the steps can be performed simultaneously. For example, in certain circumstances, multitasking and parallel processing can be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect can apply to all configurations, or one or more configurations. A phrase such as an aspect can refer to one or more aspects and vice versa. A phrase such as a "configuration" does not imply that such configuration is essential to the subject technology or that such configuration applies to all configurations of the subject technology. A disclosure relating to a configuration can apply to all configurations, or one or more configurations. A phrase such as a configuration can refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method for sharing an instance of a plug-in, the method comprising:
   determining whether a session associated with a current tab is also associated with a first tab, wherein the current tab and the first tab are included in a same instance of a window of an application;
   determining whether a security mode of the current tab matches a security mode of the first tab if the session associated with the current tab is also associated with the first tab, wherein the security modes of the current tab and the first tab respectively indicate one or more operations that are allowed to be performed by the current tab and the first tab on a computing device running the application;
   determining whether the first tab includes the instance of the plug-in if the security mode of the current tab matches the security mode of the first tab; and
   for the current tab, utilizing the plug-in in the first tab to access a shared resource associated with the first tab if the security mode of the current tab matches the security mode of the first tab, wherein the shared resource is shared between the first and current tabs according to the security mode.

2. The method of claim 1, wherein the security mode indicates a level of trustworthiness of the current tab.

3. The method of claim 1, wherein utilizing the plug-in in the first tab comprises utilizing a wrapper for the instance of the plug-in in the first tab.

4. The method of claim 3, wherein the current tab performs one or more operations utilizing the wrapper for the instance of the plug-in in the first tab.

5. The method of claim 1, wherein the shared resource is a cookie data store.

6. The method of claim 5, wherein the cookie data store is stored locally.

7. The method of claim 5, wherein the plug-in performs one or more operations on the cookie data store.

8. The method of claim 7, wherein the one or more operations includes an operation to get a plurality of cookie data stores.

9. The method of claim 7, wherein the cookie data store includes one or more cookies.

10. The method of claim 1, wherein the one or more operations comprise an operation to install a program on the computing device running the application.

11. The method of claim 1, wherein the one or more operations comprise an operation to modify system data on the computing device running the application.

12. The method of claim 1, wherein the security mode of the current tab corresponds to a protected mode, wherein the protected mode does not permit respective operations to install a program and modify system data on the computing device running the application.

13. The method of claim 1, wherein the security mode of the current tab corresponds to a unprotected mode, wherein the unprotected mode includes respective operations to install a program and modify system data on the computing device running the application.

14. The method of claim 1, wherein the security mode of the current tab corresponds to a respective security level, the respective security level including a respective set of privileges according to the respective security level for performing one or more operations on the computing device running the application.

15. The method of claim 14, wherein the respective security level includes one of an administrative, high, medium, or low security level.

16. The method of claim 1, wherein the application comprises a web client.

17. The method of claim 1, wherein utilizing the plug-in in the first tab to access the cookie data store associated with the first tab occurs without instantiating a new instance of the plug-in in memory.

18. The method of claim 1, further comprising:
generating a new instance of the plug-in in memory for the current tab if the security mode of the current tab does not match the security mode of the first tab.

19. A system for sharing an instance of a plug-in, the system comprising:
memory;
one or more processors;
one or more modules stored in memory and configured for execution by the one or more processors, the modules comprising:
a browser module configured to provide a first tab and a current tab for the web client, wherein the first tab includes the instance of the plug-in, wherein the current tab and the first tab are included in a same instance of a window of an application;
a cookies module configured to store a cookie data store associated with the first tab; and
a session module configured to determine whether a session associated with the current tab is also associated with the first tab, determine whether a security mode of the current tab matches a security mode of the first tab if the session associated with current tab is also associated with the first tab, and utilize, for the current tab, the plug-in in the first tab to access the cookie data store associated with the first tab if the security modes match, wherein the cookie data store is shared between the first and current tabs according to the matched security modes, wherein the security modes of the current tab and the first tab respectively indicate one or more operations that are allowed to be performed by the current tab and the first tab on a computing device running the application.

20. The system of claim 19, wherein the current tab utilizes the plug-in in the first tab to access the cookie data store associated with the first tab.

21. The system of claim 19, wherein the cookie data store is a shared resource of the first and current tabs.

22. The system of claim 19, wherein cookie data store includes one or more cookies for the session associated with the first tab.

23. A machine-readable medium comprising instructions stored therein, which when executed by a machine, cause the machine to perform operations comprising:
determining whether a session associated with a current tab is also associated with a first tab, wherein the current tab and the first tab are included in a same instance of a window of an application;
determining whether a security mode of the current tab matches a security mode of the first tab if the session associated with the current tab is also associated with the first tab;
determining whether the first tab includes the instance of the plug-in if the security mode of the current tab matches the security mode of the first tab, wherein the security modes of the current tab and the first tab respectively indicate one or more operations that are allowed to be performed by the current tab and the first tab on a computing device running the application; and
for the current tab, utilizing the plug-in in the first tab to access a shared resource associated with the first tab for performing one or more operations on the shared resource if the security mode of current tab matches the security mode of the first tab, wherein the shared resource is shared between the first and current tabs according to the security mode.

* * * * *